US011481243B1

(12) United States Patent
Wang et al.

(10) Patent No.: US 11,481,243 B1
(45) Date of Patent: Oct. 25, 2022

(54) SERVICE ACCESS ACROSS KUBERNETES CLUSTERS

(71) Applicant: International Business Machines Corporation, Armonk, NY (US)

(72) Inventors: Yue Wang, Beijing (CN); Gang Tang, Nanjing (CN); Yun Feng Ma, Beijing (CN); Huai Long Zhang, Chang Ping District (CN); Xiong Wei Zhao, Beijing (CN); Shuang Men, Beijing (CN); Jin Shan Li, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/411,382

(22) Filed: Aug. 25, 2021

(51) Int. Cl.
G06F 9/455 (2018.01)
G06F 9/54 (2006.01)
H04L 61/256 (2022.01)
H04L 61/2517 (2022.01)
H04L 101/604 (2022.01)

(52) U.S. Cl.
CPC .......... G06F 9/45558 (2013.01); G06F 9/547 (2013.01); H04L 61/256 (2013.01); H04L 61/2517 (2013.01); G06F 2009/4557 (2013.01); G06F 2009/45595 (2013.01); H04L 2101/604 (2022.05)

(58) Field of Classification Search
CPC . G06F 9/45558; G06F 9/547; H04L 61/2517; H04L 61/256; H04L 2101/604
See application file for complete search history.

(56) References Cited

U.S. PATENT DOCUMENTS 10,949,239 B2 * 3/2021 Gupta ................ G06F 9/45558
10,992,575 B2 4/2021 Kelam
11,316,822 B1 * 4/2022 Gawade ............. G06F 11/2025
(Continued)

FOREIGN PATENT DOCUMENTS

CN 111124607 A 5/2020
CN 111162941 A 5/2020
(Continued)

OTHER PUBLICATIONS

Saied et al., "Deploying Microservice Based Applications with Kubernetes:Experiments and Lessons Learned", 2018 IEEE 11th Conference on Cloud Computing, Jul. 2018.*
(Continued)

*Primary Examiner* — Todd L Barker
(74) *Attorney, Agent, or Firm* — Edward J. Wixted, III

(57) ABSTRACT

In an approach, a processor creates a local first Pod API object in a first lower Kubernetes cluster based on a first Pod API object in an upper Kubernetes cluster, where: the local first Pod API object includes internal and external network descriptions for a Pod described in the local first Pod API object, and the upper cluster manages the first and second lower Kubernetes cluster. A processor adds an annotation for the Pod to the local first Pod API object and the first Pod API object. A processor creates a local endpoint API object in the first lower cluster based on an endpoint API object in the upper cluster and annotations of Pods in the upper cluster. A processor redirects the first request to the endpoint of the second Pod described in the local endpoint API object.

20 Claims, 8 Drawing Sheets

(56) References Cited

U.S. PATENT DOCUMENTS

| | | | |
|---|---|---|---|
| 11,368,387 B2* | 6/2022 | Rolando | H04L 67/63 |
| 2020/0137185 A1 | 4/2020 | Parekh | |
| 2020/0314056 A1 | 10/2020 | Desmouceaux | |
| 2021/0243164 A1* | 8/2021 | Murray | H04L 61/4511 |
| 2021/0314190 A1* | 10/2021 | Liu | H04L 41/5077 |
| 2021/0314361 A1* | 10/2021 | Zhou | G06F 9/5077 |
| 2022/0116285 A1* | 4/2022 | Abdollahi Vayghan | H04L 41/0668 |

FOREIGN PATENT DOCUMENTS

| | | |
|---|---|---|
| CN | 111614738 A | 9/2020 |
| CN | 111885123 A | 11/2020 |

OTHER PUBLICATIONS

Vayghan et al., "Microservice Architecture: Towards High-Availability for Stateful Appilcatons with Kubernetes", 2019 IEEE 19th International Conference on Software Quality, Reliability and Security (QRS), Jul. 2019.*

Vaygan et al., "Microservices Based Architecture: Towards High-Availability for Stateful Applications with Kubernetes", 2019 IEEE 19th Conference on Software Quality, Reliability, and Security (QRS), Jul. 22, 2019.*

Saied et al., "Deploying Microservice Based Applications with Kubernetes: Experiments and Lessons Learned", 2018 IEEE 11th International Conference on Cloud Computing (CLOUD), Jul. 2, 2018.*

"Kubernetes Cluster Federation", Github, Printed Jul. 19, 2021, 5 pages, <https://github.com/kubernetes-sigs/kubefed>.

"Tensile-kube", Github, Printed Jul. 19, 2021, 8 pages, <https://github.com/virtual-kubelet/tensile-kube>.

"Virtual-kubelet / tensile-kube", GitHub, Printed Jul. 6, 2021, 8 pages, <https://github.com/virtual-kubelet/tensile-kube>.

Attuluri et al., "Multicluster Istio configuration and service discovery using Admiral", Istio, Jan. 5, 2020, 7 pages, <https://istio.io/latest/blog/2020/multi-cluster-mesh-automation/>.

Kim et al., "TOSCA-Based and Federation-Aware Cloud Orchestration for Kubernetes Container Platform", Appl. Sci. 2019, 9, 191, Jan. 7, 2019, 13 pages, <https://doi.org/10.3390/app9010191>.

Mell et al., "The NIST Definition of Cloud Computing", National Institute of Standards and Technology, Special Publication 800-145, Sep. 2011, 7 pages.

Rehman et al., "Kubernetes Federation Evolution", Kubernetes, Dec. 12, 2018, 5 pages, <https://kubernetes.io/blog/2018/12/12/kubernetes-federation-evolution/>.

* cited by examiner

```
apiVersion: v1
kind: Pod
metadata:
  labels:
    app: web
spec:
  containers:
  - image: web
    name: web
    ports:
    - containerPort: 80
      name: http
      protocol: TCP
    - containerPort: 443
      name: https
      protocol: TCP
status:
  hostIP: 172.16.200.1
  podIP: 10.0.0.1
```

*FIG. 6A*

```
apiVersion: v1
kind: Pod
metadata:
  annotation:
    cross-cluster-access:  {"tcp,10.0.0.1,80":"tcp,172.16.200.1,41234","tcp,10.0.0.1,443":"tcp,172.16.200.1,41235"}
  ...
```

*FIG. 6B*

```
DNAT rules:

iptables -t nat -A PREROUTING -p tcp -d 172.16.200.1 --dport 41234 -j DNAT --to-destination 10.0.0.1:80
iptables -t nat -A PREROUTING -p tcp -d 172.16.200.1 --dport 41235 -j DNAT --to-destination 10.0.0.1:443
```

*FIG. 6C*

```
apiVersion: v1
kind: Endpoints
metadata:
  labels:
    app: web
  name: web
  namespace: default
subsets:
- addresses:
  - ip: 10.0.0.1
    targetRef:
      kind: Pod
      name: web-7cbcd7884d-4gv42
      namespace: default
  - ip: 20.0.0.1
    targetRef:
      kind: Pod
      name: web-7cbcd7884d-5l7cz
      namespace: default
  ports:
  - name: http
    port: 80
    protocol: TCP
```

*FIG. 7A*

```
apiVersion: v1
kind: Endpoints
metadata:
  labels:
    app: web
  name: web
  namespace: default
endpoints:
  - ip: 10.0.0.1
    name: http
    port: 80
    protocol: tcp
    weight : 4
  - ip: 172.17.200.1
    name: https
    port: 42000
    protocol: tcp
    weight : 1
```

*FIG. 7C*

```
Pod web-7cbcd7884d-4gv4
  annotation:
    cross-cluster-access:  {"tcp,10.0.0.1,80":"tcp,172.16.200.1,41234"}
```

```
Pod web-7cbcd7884d-5l7cz
  annotation:
    cross-cluster-access:  {"tcp,20.0.0.1,80":"tcp,172.17.200.2,42000"}
```

*FIG. 7B*

SERVICE ACCESS ACROSS KUBERNETES CLUSTERS

BACKGROUND

The present invention relates generally to the field of container orchestration, and more particularly to service access across Kubernetes clusters.

Cloud computing infrastructures are becoming increasingly popular due to their increased scale, agility, and elasticity as well as ability to quickly provision on-demand (in the case of cloud computing infrastructures) to meet increased customer requirements. Kubernetes, as a cloud computing infrastructure, is a portable, extensible, open-source platform for managing containerized workloads and services. Kubernetes facilitates both declarative configuration and automation. Multi-cloud/hybrid-cloud computing environments, which are compositions of private clouds and/or public clouds, are becoming increasingly popular. In such computing environments, an application may be deployed on multiple computing clusters formed from different cloud computing environments. A Kubernetes Cluster environment is a such kind of multi-cloud/hybrid-cloud computing environment.

Services and application instances are often deployed to multi Kubernetes clusters. To achieve service access across such clusters, there are known implementation variants, but each has limitations and disadvantages. For example, some solutions rely on external load balancers that relay on an external Domain Name System (DNS) to resolve service. Some other solutions require pod network connectivity across clusters, which may not be practical in all scenarios.

SUMMARY

According to one embodiment of the present invention, a computer-implemented method is provided. A processor creates a local first Pod application program interface (API) object in a first lower Kubernetes cluster based on a first Pod API object in an upper Kubernetes cluster, where: the local first Pod API object includes an internal network description and an external network description for a Pod described in the local first Pod API object; and the upper Kubernetes cluster manages the first lower Kubernetes cluster and a second lower Kubernetes cluster. A processor adds an annotation for the Pod to both the local first Pod API object and the first Pod API object, the annotation including a mapping between the internal network description and the external network description for the Pod. A processor creates a local endpoint API object in the first lower Kubernetes cluster based on an endpoint API object in the upper Kubernetes cluster and annotations of Pods in the upper Kubernetes cluster, wherein in the local endpoint API object an endpoint of a second Pod in the second lower Kubernetes cluster is described as an external network description for the second Pod. A processor, in response to a first request being from a first Pod within the first lower Kubernetes cluster for accessing a service serving by the second Pod, redirects the first request to the endpoint of the second Pod described in the local endpoint API object. Such an approach has an advantage of providing service access across Kubernetes clusters without binding to a third party platform.

According to another embodiment of the present invention, a computer program product is provided that includes one or more computer readable storage media, and program instructions collectively stored on the one or more computer readable storage media. The program instructions include program instructions to create a local first Pod application program interface (API) object in a first lower Kubernetes cluster based on a first Pod API object in an upper Kubernetes cluster, where: the local first Pod API object includes an internal network description and an external network description for a Pod described in the local first Pod API object; and the upper Kubernetes cluster manages the first lower Kubernetes cluster and a second lower Kubernetes cluster. The program instructions also include program instructions to add an annotation for the Pod to both the local first Pod API object and the first Pod API object, the annotation including a mapping between the internal network description and the external network description for the Pod. The program instructions also include program instructions to create a local endpoint API object in the first lower Kubernetes cluster based on an endpoint API object in the upper Kubernetes cluster and annotations of Pods in the upper Kubernetes cluster, where in the local endpoint API object an endpoint of a second Pod in the second lower Kubernetes cluster is described as an external network description for the second Pod. The program instructions also include program instructions to, in response to a first request being from a first Pod within the first lower Kubernetes cluster for accessing a service serving by the second Pod, redirect the first request to the endpoint of the second Pod described in the local endpoint API object. Such an approach has an advantage of providing service access across Kubernetes clusters without binding to a third party platform.

According to another embodiment of the present invention, a computer system is provided that includes one or more computer readable storage media, and program instructions collectively stored on the one or more computer processors, one or more computer readable storage media, and program instructions collectively stored on the one or more computer readable storage media for execution by at least one of the one or more computer processors. The program instructions include program instructions to create a local first Pod application program interface (API) object in a first lower Kubernetes cluster based on a first Pod API object in an upper Kubernetes cluster, where: the local first Pod API object includes an internal network description and an external network description for a Pod described in the local first Pod API object; and the upper Kubernetes cluster manages the first lower Kubernetes cluster and a second lower Kubernetes cluster. The program instructions also include program instructions to add an annotation for the Pod to both the local first Pod API object and the first Pod API object, the annotation including a mapping between the internal network description and the external network description for the Pod. The program instructions also include program instructions to create a local endpoint API object in the first lower Kubernetes cluster based on an endpoint API object in the upper Kubernetes cluster and annotations of Pods in the upper Kubernetes cluster, where in the local endpoint API object an endpoint of a second Pod in the second lower Kubernetes cluster is described as an external network description for the second Pod. The program instructions also include program instructions to, in response to a first request being from a first Pod within the first lower Kubernetes cluster for accessing a service serving by the second Pod, redirect the first request to the endpoint of the second Pod described in the local endpoint API object. Such an approach has an advantage of providing service access across Kubernetes clusters without binding to a third party platform.

Each of the computer-implemented method, computer program product, and computer system may optionally further have the first request be redirected to an internal network description for the second Pod described in a local second Pod API object in the second lower Kubernetes cluster based on an annotation of the second Pod, and the local second Pod API object comprises the annotation of the second Pod. Further, the annotation of the second Pod may include a mapping between an internal network description for the second Pod in the second lower Kubernetes cluster and the external network description for the second Pod. Such an approach has an advantage of further providing service access across Kubernetes clusters without binding to a third party platform.

BRIEF DESCRIPTION OF THE DRAWINGS

Through the more detailed description of some embodiments of the present invention in the accompanying drawings, the above and other objects, features and advantages of embodiments of the present invention will become more apparent, wherein the same reference generally refers to the same components in the embodiments of the present invention.

FIG. 6A depicts an example Pod application programming interface (API) object of a Pod according to an embodiment of the present invention.

FIG. 6B depicts the annotation named "cross-cluster-access" as added to the Pod API object shown in FIG. 6A according to an embodiment of the present invention.

FIG. 6C depicts the destination network address translation (DNAT) rules generated by the service helper on the node according to an embodiment of the present invention.

FIG. 7A depicts an example endpoint API object in the upper cluster according to an embodiment of the present invention.

FIG. 7B depicts example cross-cluster-access annotations for two Pods stored in an upper cluster according to an embodiment of the present invention.

FIG. 7C depicts an example local endpoint API object in a lower cluster created by a service controller based on an endpoint API object shown in FIG. 7A according to an embodiment of the present invention.

DETAILED DESCRIPTION

Figure 1:
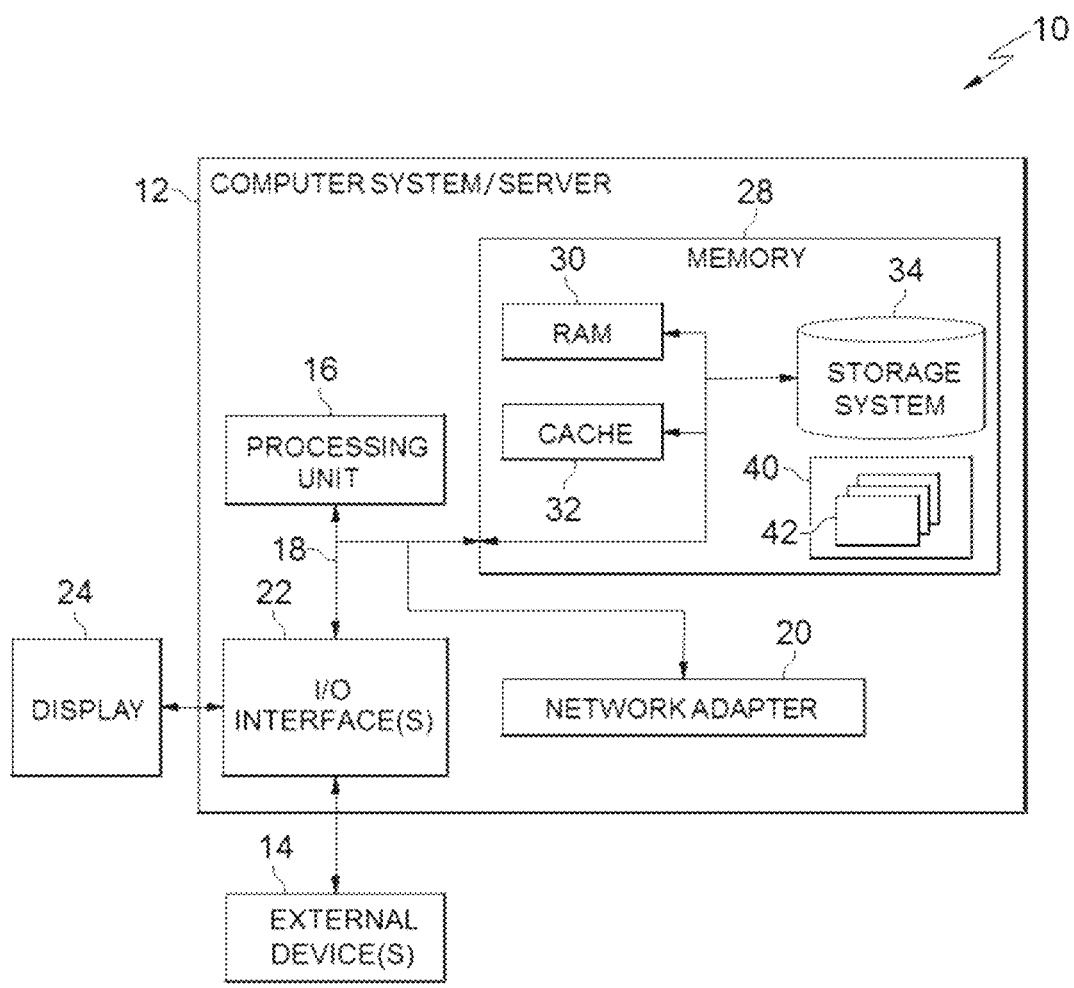
FIG. 1 depicts a cloud computing node according to an embodiment of the present invention.

Some embodiments will be described in more detail with reference to the accompanying drawings, in which the embodiments of the present invention have been illustrated. However, embodiments of the present invention can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
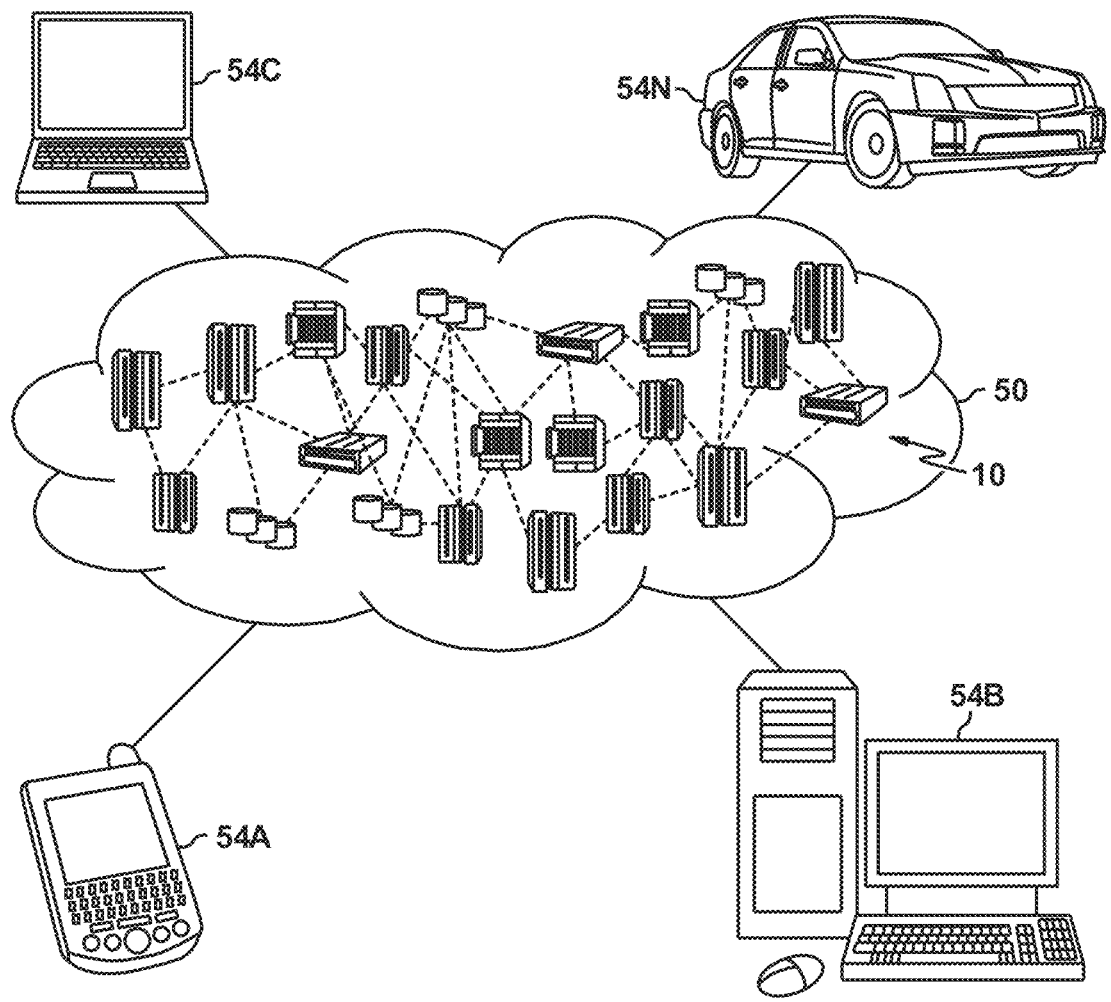
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
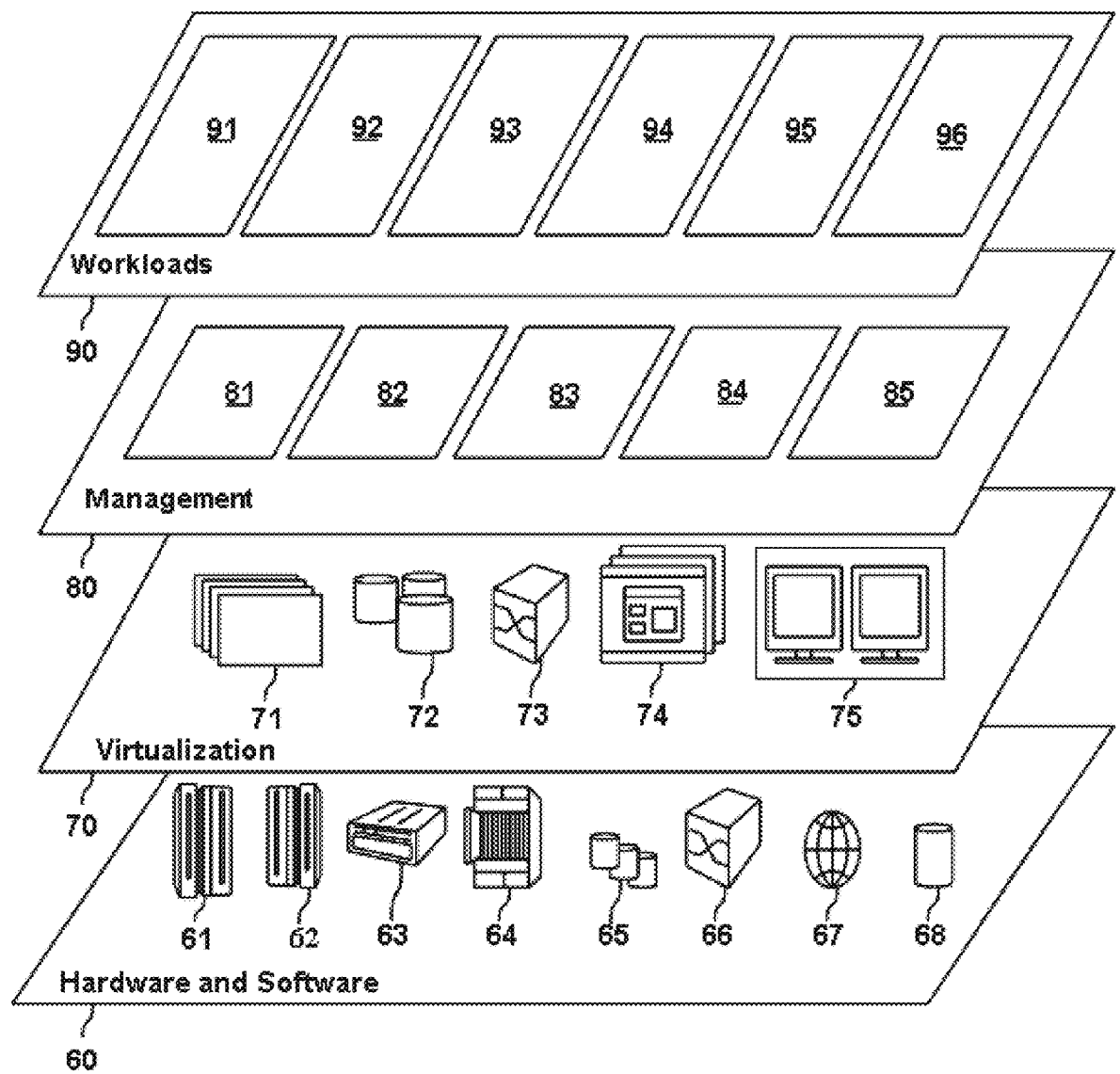
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service access across Kubernetes clusters 96.

As used herein, an "application" can be a general term that can refer to any application capable of being executed in or otherwise provisioned in a computing environment to support corresponding tasks or functions. For example, an application can be any type of software application, web service, identity management service, firewall or other security service, messaging service, data storage or backup service, file maintenance service, status monitoring, or any other service that can be made available to consumers of the computing environment.

As is known, Pods, services, and endpoints are all resources of Kubernetes defined by corresponding application programming interface (API) objects. Once a corresponding API object is created, Kubernetes may create corresponding resources in a Kubernetes cluster.

For example, a deployment resource definition, which includes a template for creating a Pod API object, may be created by such as an administrator. The Pod API object includes metadata and a spec of Pods on which instances of an application are to be deployed. Kubernetes may then create the Pods and deploy the instances of the application on the Pods in a node in the Kubernetes cluster based on the metadata and the spec of the Pods. The spec of the Pods includes ports of containers (referred to container ports) on which instances of the application are to be deployed. Then these instances of the application can be accessed by other Pods within the cluster. And existing technology supports to add an annotation for a Pod described in the Pod API object.

As used herein, "service" is an abstract way to expose an application running on a set of Pods as a network service. A service specification, which includes a service API object, may be created by such as an administrator. Once the service API object is created, Kubernetes may assign the service an IP address named "cluster IP" which is a virtual IP address. Kubernetes may add a record in Domain Name System (DNS) to map a service name to cluster IP. And if the service specification includes a selector field, a selector may select Pods satisfying the requirement of the selector in a cluster. Then an endpoint API object may be created automatically by Kubernetes. But if the service specification does not include a selector field, the endpoint API object may not be created automatically by Kubernetes but need to be created manually. In the endpoint API object, endpoints of Pods to be selected may be included. A component named kube-proxy may configure destination network address translation (DNAT) rules, such as add iptables rules, to map the cluster IP to the endpoints of Pods based on the endpoint API object. Then a request to access a service can be redirect to an endpoint of a Pod described in the endpoint API object.

In many cases, an application may be deployed on a multi-cloud management system, such as multi-Kubernetes cluster, as a plurality of application instances to process workload.

Figure 4:
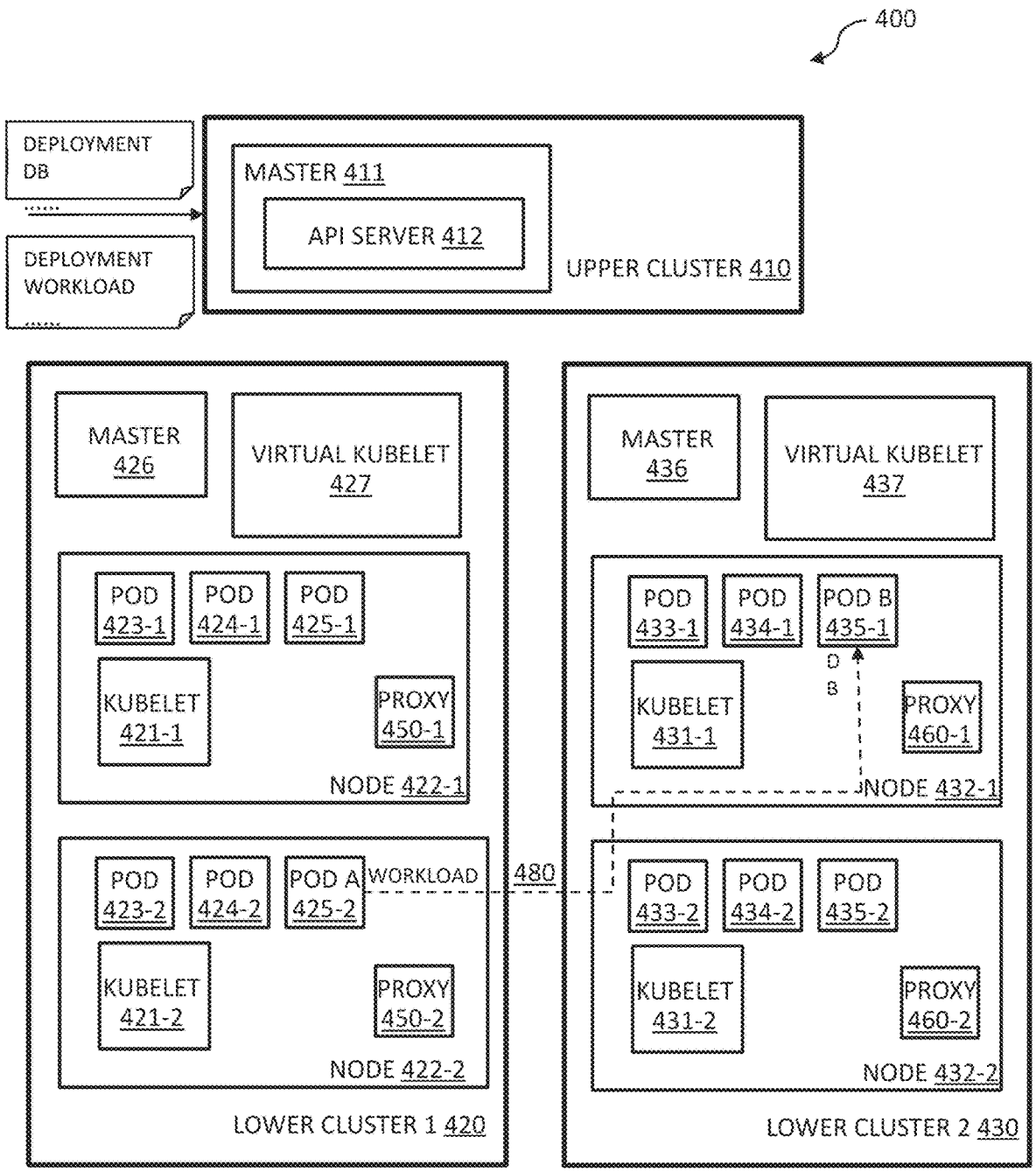
FIG. 4 depicts a block diagram of an example multi-Kubernetes cluster computing environment for deployment of a plurality of application instances according to an embodiment of the present invention.

FIG. 4 depicts a block diagram of an example multi-Kubernetes cluster computing environment 400 for deployment of a plurality of application instances. As shown, the computing environment 400 includes an upper Kubernetes cluster (hereinafter upper cluster) 410 and a plurality of lower Kubernetes clusters (hereinafter lower cluster) 420 and 430. It should be noted that two lower clusters are taken as examples to describe the environment 400. Those skilled in the art can know that the environment 400 may include more lower clusters. The upper cluster 410 and the plurality of lower clusters are connected via a communication network which is not shown in FIG. 4.

The communication network may include various types of communication networks, such as a wide area network (WAN), local area network (LAN), a telecommunication network, a wireless network, a public switched network and/or a satellite network. The communication network may include connections, such as wire, wireless communication links, or fiber optic cables. It may be appreciated that FIG. 4 provides only an illustration of one implementation and does not imply any limitations with regard to the environments in which different embodiments may be implemented. Many modifications to the depicted environments may be made based on design and implementation requirements.

The upper cluster 410 is configured to manage the plurality of lower clusters 420 and 430, such as monitoring resources of the plurality of lower clusters 420 and 430, deploying one or more applications on the plurality of lower clusters 420 and 430, and so on. As illustrated, the upper cluster 410 includes a master 411 to manage the plurality of lower clusters 420 and 430. The master 411 includes an API server 412 through which an administrator can send a deployment request for deploying an application, or other kind of requests.

The plurality of lower clusters 420 and 430 are configured to be deployed application instances to run corresponding workload. The lower clusters 420 and 430 also include corresponding masters 426 and 436 to communicate with the upper cluster 410 and manage the lower clusters 420 and 430. The lower clusters 420 and 430 also include corresponding virtual kubelets 427 and 437 as management components. In some embodiments, the virtual kubelets 427 and 437 may not be within the lower clusters 420 and 430, but be outside the lower clusters 420/430, even within the upper clusters 410.

Each of the lower clusters 420 and 430 may also include a plurality of nodes (e.g., nodes 522-2 and 532-1). For example, the lower cluster 420 includes two nodes 422-1 to 422-2. Lower cluster 430 includes two notes 432-1 and 432-2 A node may be described as a server, computer, computing node, or virtual machine. The nodes in the lower clusters 420 and 430 may provide resources required for running applications deployed thereon. Examples of such resources may include, but are not limited to, processing resources, memory resources, storage resources, networking bandwidth, and/or other resources needed in application deployment. Each node includes a kubelet (such as kubelets 421-1, 421-2, 431-1, and 431-2 as a management component of the node and kube-proxy (such as kube-proxies 450-1, 450-2, 460-1, and 460-2) for generating DNAT rules so that a request can be redirected from service to virtual IP. Each node may also include a plurality of Pods (such as pods 423-2, 424-2, 433-1, 433-2, 434-1, 434-2, and 435-2). A Pod may include at least one container on which an application instance may be deployed.

The upper cluster may store Pod API objects and endpoint API objects corresponding to respective service API objects, each corresponding to respective lower clusters.

In some embodiments, the upper cluster 410 may deploy a plurality of applications instances on different lower clusters due to some reasons, such as resource restriction, high availability, and the like. Because the lower clusters in the computing environment 400 may be owned by different cloud providers, different lower clusters may need to access services therebetween via network connections.

In an example, as indicated in FIG. 4, the upper cluster 410 may deploy a business application named APP1. The APP1 includes two applications, i.e., applications workload and DB. The upper cluster 410 may deploy an instance of the application workload on a POD A 425-2 in the node 422-2 of the lower cluster 420 and deploy an instance of the application DB on a POD B 435-1 in the node 432-1 of the lower cluster 430. However, the lower cluster 420 and the lower cluster 430 are owned by different cloud providers without network access therebetween. The lower cluster 420 cannot access the instance of the application DB on the POD B 435-1 from the instance of the application workload deployed on the POD A 425-2 as there is no network connection between the lower cluster 420 and the lower cluster 430, as indicated by a dotted line 480.

To achieve above service access across Kubernetes clusters, there are several existing implementations, but each has its limitations and disadvantages. For example, in two implementations named Multi-cluster Istio Configuration and Admiral Service Discovery respectively, both need to bound to Istio and have performance and resource consumption issues. Another implementation is to leverage Federated Services on Cross-cluster Service Discovery. But in the implementation, an application cannot use cluster IP to access the service but use external DNS to resolve the service to external IPs due to its limitations such as data path relying on external load balancer. In yet another implementation of Tensile-kube's way of Cross-cluster Service Discovery and Network Connectivity, it requires Pod network connectivity across clusters. The implementation is not practical in many scenarios, such as federation, multi-cloud management, and extend existing clusters.

In this disclosure, a system for service access across Kubernetes Clusters is proposed. Instead of bounding to third party platform, defining global virtual Internet Protocol (IP) address (VIP) or DNS, or building networks between different clusters, a service helper component on a node in a lower cluster and a service controller component in the lower cluster may be built in this solution. The service helper component may be built to generate a mapping between an internal network description and an external network description for a Pod on the node in the lower cluster. And the service controller component may be built to convert an endpoint API object stored in the upper cluster to a local endpoint API object stored in the lower cluster based on the mapping. Then a pod in a first lower cluster may access a service serving by a Pod in a second lower cluster based on the converted local endpoint API object stored in the first lower cluster.

Figure 5:
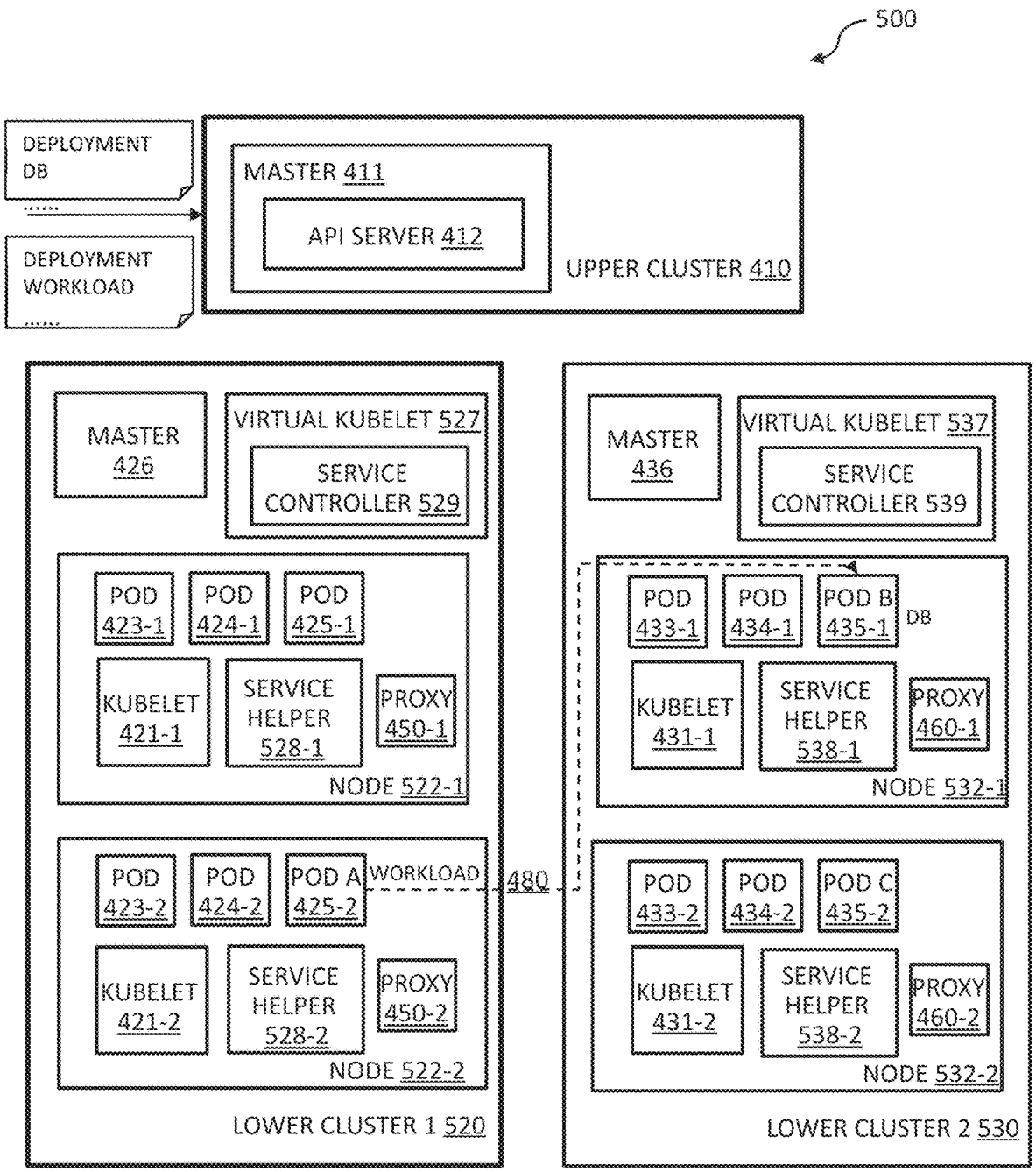
FIG. 5 depicts a block diagram of an example multi-Kubernetes cluster computing environment for service access across Kubernetes clusters according to an embodiment of the present invention.

FIG. 5 depicts a block diagram of a proposed multi-Kubernetes cluster computing environment 500 for service access across Kubernetes clusters according to some embodiments of the present invention. In both FIG. 4 and FIG. 5, the same reference numbers represent the same components. Referring to FIG. 5, the upper cluster 410 may manage a plurality of lower clusters, such as lower clusters 520 and 530. Pod API objects, service API objects, and endpoint API objects, each corresponding to respective lower clusters, may be stored in a storage related to the upper cluster 410.

Respective Pod API objects may be originally created and stored in the upper cluster 410, and respective service helper in respective lower clusters may create corresponding Pod API objects on respective lower clusters. Each created Pod API object may be scheduled on a node of corresponding lower cluster. A service helper component and a kube-proxy component may run on each node in each lower cluster. In addition, each virtual kubelet in each lower cluster may include a service controller component. For example, a service helper instance 528-1 and a kube-proxy 550-1 may run on a node 522-1. A service helper instance 528-2 and a kube-proxy 550-2 may run on a node 522-2. A service helper instance 538-1 and a kube-proxy 560-1 may run on a node 432-1. A service helper instance 538-2 and a kube-proxy 560-2 may run on a node 532-2. A service controller instance 529 may run on a virtual kubelet 527. A service controller instance 539 may run on a virtual kubelet 537. It can be understood that the service controller component may be not included in corresponding virtual kubelet but in other part of the corresponding lower cluster.

In the following, the service helper 528-2 is taken as an example to describe the function of each service helper. It can be understood that other service helpers have the same functions.

In some embodiments, the service helper 528-2 (which is an instance of the service helper) may be configured with a node IP address and an external container port range. The node IP configured should be accessible from pods in all other lower clusters and could be any of the real node IP address that registered with the cluster, the floating IP address of the node and the global IP address of the node. The service helper 528-2 may create a local Pod API object in the lower cluster 520 based on a corresponding Pod API object on the upper cluster 410. The service helper 528-2 may also select an un-used external container port from the configured external port range for each internal container port described in the local Pod API object. Then the local Pod API object in the lower cluster 520 may comprise an internal network description and an external network description for each Pod described therein.

In some embodiments, the service helper 528-2 may also generate each mapping between the internal network description and the external network description for each Pod described in the local Pod API object. In some embodiments, after a selection of an external container port for each internal container port described in the local Pod API object, the internal network description for a Pod may be a 3-tuple [protocol of network, Pod IP, internal container port] and the external network description of the Pod may be a 3-tuple [protocol of network, node IP, external container port]. In some embodiments, the service helper 528-2 may add each mapping between the 3-tuple [protocol of network, Pod IP, internal container port] for each Pod and the 3-tuple [protocol of network, node IP, external container port] for each Pod to each annotation for each Pod described in the local Pod API object and the Pod API object. It can be understood that the internal network description and the external network description for each Pod can be defined based on requirements. For example, if the protocol of network is fixed, such as Transmission Control Protocol (TCP), then the internal network description may be a data pair [Pod IP, internal container port] and the external network description for the Pod may be a data pair [node IP, external container port].

In some embodiment, the service helper 528-2 may create DNAT rules serving as access point for a request from a Pod outside the local lower 520 cluster. With these DNAT rules, existing iptables technology may be used so that the Pod outside the lower cluster 520 can access the Pod in the lower cluster 520. It can be understood that other service helpers may carry out the same functions.

In an example, FIG. 6A depicts an example Pod API object of the Pod A 425-2 according to some embodiments of this invention. The Pod API object may be stored in the upper cluster 410 and used by the cluster 520 to deploy an application "web" on the Pod A 425-2. It can be read from FIG. 6A that a Pod IP of the Pod A 425-2 is "10.0.0.1," a node IP of the Pod A 425-2 is "172.16.200.1" and two internal container ports for deploying the web instances are 80 and 443 respectively. The service helper 528-2 may read the Pod API object of the Pod A 425-2 and generate a local Pod API object (not shown directly in Figures) in the cluster 520. The local Pod API object may include two mappings between two 3-tuple, i.e., a mapping of {"tcp,10.0.0.1,80": "tcp,172.16.200.1,41234"} and a mapping of {"tcp,10.0.0.1, 443":"tcp,172.16.200.1,41235"}. FIG. 6B depicts the annotation named "cross-cluster-access," which may be added to the Pod API object shown in FIG. 6A and the local Pod API object according to some embodiments of this invention. It can be understood that FIG. 6B is just an example format of the annotation. Those skilled in the art can use other formats of annotation. It will be appreciated that other service helpers in other lower clusters may add annotations for Pods described in other Pod API objects in other lower clusters.

FIG. 6C depicts the DNAT rules generated by the service helper 528-2 on the node 522-2 according to some embodiments of this invention. These DNAT rules may serve as access point for pods outside the lower cluster 520. From FIG. 6C, it can be found that when a request tries to access a Pod by accessing such as node IP of "172.16.200.1" and external container port "41234" using TCP protocol, Kubernetes may route the request to the pod IP of "10.0.0.1" and internal container port "80" using TCP protocol. In this way, Pods outside the lower cluster 520 can access a Pod in the lower cluster 520.

Usually, a request may access a service exposing the application running on a Pod instead of directly accessing the external network address of the Pod deploying the application instance. Suppose that a service API object corresponding to the service, a corresponding endpoint API object, and a corresponding Pod API object have been created in the upper cluster based on a deployment specification. The corresponding Pod API object and the corresponding endpoint API object have been stored in the storage of the upper cluster 410.

In the following, the service controller 529 is taken as an example to describe the function of each service controller. It can be understood that other service controllers have the same functions.

In some embodiments, the service controller 529 (which is an instance of the service controller) running in the lower cluster 520 may read the service API object in the upper cluster 410, and delete the selector field and Cluster IP (which is assigned on the upper cluster and has no meaning in a lower cluster) to create a local service API object, And then the service controller 529 may create corresponding service in the lower cluster 520 based on the local service API object.

As the selector field is deleted in the local service API object, a corresponding local endpoint API object in the lower cluster 520 will not be created automatically. Then the service controller 529 may create the corresponding local endpoint API object in the lower cluster 520, based on the endpoint API object in the upper cluster 410. The local endpoint API object may comprise endpoints of Pods in lower Kubernetes clusters managed by the upper Kubernetes cluster. In the local endpoint API object, an endpoint of a Pod outside the lower cluster 520 (such as in the lower cluster 530) is described as an external network description for the Pod.

Specifically, in some embodiments, the service controller 529 may create a first 3-tuple [protocol of network, Pod name, internal container port] for each Pod described in the endpoint API object based on contents in the endpoint API object in the upper cluster 410. Then the service controller 529 may determine a second 3-tuple [protocol of network, IP, container port] for each Pod described in the local endpoint API object in the lower cluster 520 based on the first 3-tuple [protocol of network, Pod name, internal container port] for each Pod and annotations for Pods stored in the upper Kubernetes cluster 410. The annotations for Pods may be from other lower clusters. Then, the service controller 529 may create the local endpoint API object in the first lower Kubernetes cluster 520 based on the second 3-tuple [protocol, IP, container port] for each Pod.

In particular, in some embodiments, if a Pod (such as the Pod A 425-2) is within the lower cluster 520, the service controller 529 may determine the second 3-tuple [protocol of network, IP, container port] for the Pod to be the 3-tuple [protocol of network, Pod IP, internal container port] for the Pod. If a Pod (such as the Pod B 435-1) is outside the cluster 520, the service controller 529 may determine the second 3-tuple [protocol of network, IP, container port] for the Pod to be the 3-tuple [protocol of network, node IP, external container port] for the Pod. In some embodiments, during determining the 3-tuple [protocol of network, node IP, external container port] for a Pod, the service controller 529 may convert the first 3-tuple [protocol of network, Pod name, internal container port] for the Pod to the 3-tuple [protocol of network, Pod IP, internal container port] for the Pod, and then retrieve an annotation for the Pod using the 3-tuple [protocol of network, Pod IP, internal container port] as a keyword from the upper cluster 410.

Following shows an exemplary process for creating corresponding local endpoint API object in the lower cluster 520 based on the corresponding endpoint API object in the upper cluster 410. In the example, FIG. 7A depicts an example endpoint API object retrieved by the service controller 529 from the upper cluster 410, in which two Pods named "web-7cbcd7884d-4gv42" and "web-7cbcd7884d-517cz" are involved. The service controller 529 may create two first 3-tuples [tcp, web-7cbcd7884d-4gv42, 80] and [tcp, web-7cbcd7884d-517cz, 80]. Suppose that the Pods named "web-7cbcd7884d-4gv42" and "web-7cbcd7884d-517cz" are the Pod A 425-2 and the Pod B 435-1, respectively.

FIG. 7B depicts example "cross-cluster-access" annotations for the above two Pods stored in the upper cluster 410, which are created by the service helpers 528-2 and 538-1 respectively. The service controller 529 may convert the two first 3-tuples to these two 3-tuples [tcp, 10.0.0.1, 80] and [tcp, 20.0.0.1, 80]. As the Pod named "web-7cbcd7884d-4gv42" (i.e., the Pod A 425-2) is within the lower cluster 520, the service controller 529 may determine that the second 3-tuple [protocol of network, IP, internal container port] for the Pod A 425-2 is [tcp, 10.0.0.1, 80]. By comparison, as the Pod named "web-7cbcd7884d-517cz" (i.e., the Pod A 435-1) is outside the lower cluster 520, the service controller 529 may retrieve a corresponding 3-tuple [tcp, 172.17.200.2, 42000] of the Pod using [tcp, 20.0.0.1, 80] as a keyword from "cross-cluster-access" annotations for Pods stored in the upper cluster 410 (shown in FIG. 7B). Then the service controller 529 may determine that the second 3-tuple [protocol of network, IP, internal container port] for the Pod A 435-1 is [tcp, 172.17.200.2, 42000], which is the endpoint of the Pod A 435-1. The service controller 529 may create a local endpoint API object in the lower cluster 520 based on these two second 3-tuples for these two Pods. FIG. 7C depicts an example local endpoint API object created by the service controller 529 in the lower cluster 520.

In some embodiments, the service controller 529 may assign different weights to different endpoints in the local endpoint API object according to whether an endpoint (e.g., a corresponding Pod) is within or outside the lower cluster. As shown in FIG. 4C, the service controller 529 may assign weight 4 to the endpoint [tcp, 10.0.0.1, 80] and weight 1 to the endpoint [tcp, 172.17.200.2, 42000]. It is more likely for a request from a Pod within the lower cluster to be redirect to the endpoint with higher weight (e.g. another Pod serving to the request within the lower cluster).

After the local endpoint API object is created, the existing kube-proxy 550-2 (which is also an instance of the kube-proxy) may generate DNAT rules using iptables technology. These iptables, which may capture traffic for accessing the service, may be installed. The traffic to one of the endpoints described in the local endpoint API object in the lower cluster 520 may be redirected based on these DNAT rules.

In some embodiments, the service controller 529 may monitor annotation changes in the local Pod API object in the lower cluster 520 and update the corresponding Pod API object in the upper cluster 410 accordingly.

Using above environment 500, if a request from a Pod in the lower cluster 520 (such as the Pod 423-1, 424-1, or 425-1) is to access a service via corresponding cluster IP, Kubernetes in the lower cluster 520 may redirect the request to the endpoint [tcp, 10.0.0.1, 80] serving by the Pod A 425-2 directly, Kubernetes in the lower cluster 520 may also redirect the request to the endpoint [tcp, 172.17.200.2, 42000] serving by Pod B 435-1 in the lower cluster 530 based on the created local endpoint API object in the lower cluster 520. Then Kubernetes in the lower cluster 530, after receiving the request, may redirect the request to the endpoint [tcp, 20.0.0.1, 80] in the lower cluster 530 based on the DNAT rules generated by the service helper 538-1 from the annotation for the Pod B 435-1 in a Pod API object in the lower cluster 530.

In this way, the application can access the service in a different cluster, and user could build cloud federation environments without a need to bound to any third-party technologies and without a need to rely on special network connectivity.

Figure 8:
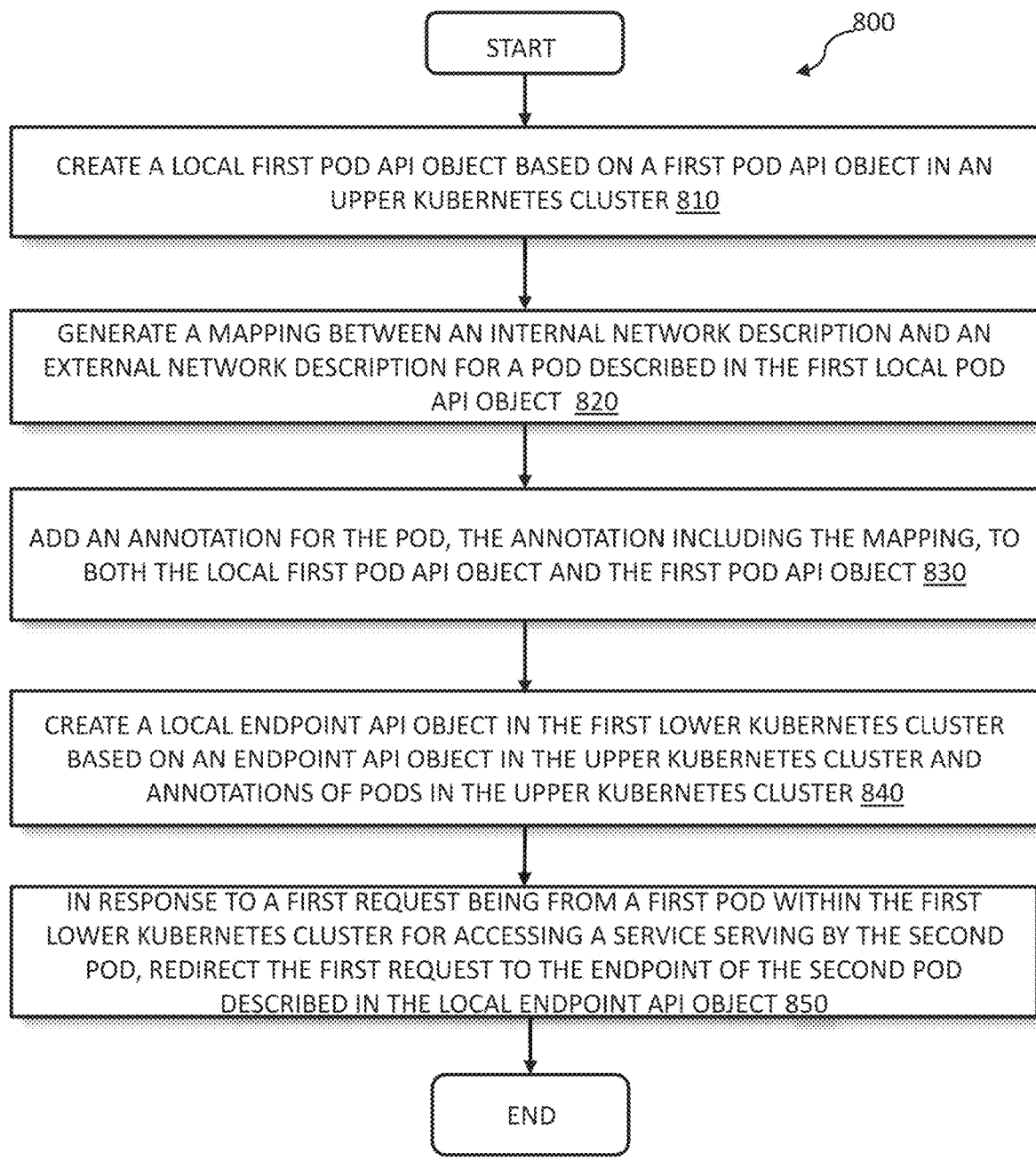
FIG. 8 depicts an operational flowchart for service access across Kubernetes clusters according to an embodiment of the present invention.

Referring to FIG. 8, an operational flowchart 800 for service access across Kubernetes clusters is depicted according to some embodiments of the present invention. The method can be implemented by a first lower Kubernetes cluster of the plurality of lower Kubernetes clusters managed by an upper Kubernetes cluster. According to the method, at step 810, the first lower Kubernetes cluster may create a local first Pod API object in the first lower Kubernetes cluster based on a first Pod API object in an upper Kubernetes cluster, the local first Pod API object comprising an internal network description and an external network description for a Pod described in the local first Pod API object. At step 820, the first lower Kubernetes cluster may generate a mapping between the internal network description and the external network description for the Pod described in the local first Pod API object. At step 830, the first lower Kubernetes cluster may add an annotation for each Pod, the annotation including the mapping, to both the local first Pod API object in the first lower Kubernetes cluster and the first Pod API object in the upper Kubernetes cluster. At step 840, the first lower Kubernetes cluster may create a local endpoint API object in the first lower Kubernetes cluster based on an endpoint API object in the upper Kubernetes cluster and annotations for Pods in the upper Kubernetes cluster, where in the local endpoint API object, an endpoint of a second Pod in the second lower Kubernetes cluster is described as an external network description for the second Pod. At step 850, in response to a first request from a first Pod within the first lower Kubernetes cluster for accessing a service serving by the second Pod (such as via a cluster IP), the first lower Kubernetes cluster may redirect the first request to the endpoint of the second Pod described in the local endpoint API object.

In some embodiments, the second lower Kubernetes cluster, in response to receiving the first request, may redirect the first request to an internal network description for the second Pod described in a local second Pod API object in the second lower Kubernetes cluster based on an annotation of the second Pod. The local second Pod API object may comprise the annotation of the second Pod, and the annotation of the second Pod may comprise a mapping between an internal network description for the second Pod in the second lower Kubernetes cluster and the external network description for the second Pod.

In some embodiments, in the local endpoint API object, an endpoint of a third Pod in the first lower Kubernetes cluster is described as an internal network description for the third Pod in the first lower Kubernetes cluster, the method 800 further comprises the following step: the first lower Kubernetes cluster may redirect a second request to the endpoint of the third Pod described in the local first endpoint API object in response to the second request being from the first Pod for accessing a service serving by the third Pod.

In some embodiments, the internal network description for each Pod is a 3-tuple [protocol of network, Pod IP, internal container port] for each Pod and the external network description for each Pod is a 3-tuple [protocol of network, node IP, external container port] for each Pod.

In some embodiments, the step 820 may comprises the following step: the first lower Kubernetes cluster may select an un-used external container port from configured external container port range for each internal container port as the corresponding external container port for each internal container port in response to no corresponding external container port for each internal container port described in the local first Pod API object.

In some embodiments, the step 830 may comprises the following steps: the first lower Kubernetes cluster may first create a first 3-tuple [protocol of network, Pod name, internal container port] for each Pod described in the endpoint API object; and then determine a second 3-tuple [protocol of network, IP, container port] for each Pod based on the first 3-tuple [protocol, Pod name, internal container port] for each Pod and annotations for Pods in the upper Kubernetes cluster; and finally create the local endpoint API object for the first lower Kubernetes cluster based on the second 3-tuple [protocol, IP, container port] for each Pod.

In some embodiments, the step of determining a second 3-tuple [protocol of network, IP, container port] for each Pod based on the first 3-tuple [protocol, Pod name, internal container port] for each Pod and annotations for Pods in the upper Kubernetes cluster may comprises: if a pod is within the first lower Kubernetes cluster, the first lower Kubernetes cluster may determine the second 3-tuple [protocol, IP, container port] for the Pod to be the 3-tuple [protocol of network, Pod IP, internal container port] for the Pod. If a pod is outside the first lower Kubernetes cluster, the first lower Kubernetes cluster may determine the second 3-tuple [protocol, IP, container port] for the Pod to be the 3-tuple [protocol of network, node IP, external container port] for the Pod based on the annotations for Pods in the upper Kubernetes cluster.

In some embodiments, the step of determining the second 3-tuple [protocol, IP, container port] for the Pod to be the 3-tuple [protocol of network, node IP, external container port] for the Pod based on the annotations for Pods in the upper Kubernetes cluster comprises: if a pod is outside the first lower Kubernetes cluster, the first lower Kubernetes cluster may first convert a first 3-tuple [protocol, Pod name, internal container port] for the Pod to the 3-tuple [protocol of network, Pod IP, internal container port] for the Pod, and then retrieve an annotation for the Pod using the 3-tuple [protocol of network, Pod IP, internal container port] as a keyword from the upper Kubernetes cluster; and finally obtain the 3-tuple [protocol, node IP, external container port] for the Pod based on retrieved annotation of the Pod.

In some embodiments, the second lower Kubernetes cluster may redirect the first request based on DNAT rules generated on the second lower Kubernetes cluster, which may use existing iptables technology.

It should be noted that the method or the system for service access across different Kubernetes clusters according to embodiments of this invention could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    creating a local first Pod application program interface (API) object in a first lower Kubernetes cluster based on a first Pod API object in an upper Kubernetes cluster, wherein:
        the local first Pod API object comprises an internal network description and an external network description for a Pod described in the local first Pod API object; and
        the upper Kubernetes cluster manages the first lower Kubernetes cluster and a second lower Kubernetes cluster;
    adding an annotation for the Pod to both the local first Pod API object and the first Pod API object, the annotation including a mapping between the internal network description and the external network description for the Pod;
    creating a local endpoint API object in the first lower Kubernetes cluster based on an endpoint API object in the upper Kubernetes cluster and annotations of Pods in the upper Kubernetes cluster, wherein in the local endpoint API object an endpoint of a second Pod in the second lower Kubernetes cluster is described as an external network description for the second Pod; and
    in response to a first request being from a first Pod within the first lower Kubernetes cluster for accessing a service serving by the second Pod, redirecting the first request to the endpoint of the second Pod described in the local endpoint API object.

2. The computer-implemented method of claim 1, wherein:
- the first request is redirected to an internal network description for the second Pod described in a local second Pod API object in the second lower Kubernetes cluster based on an annotation of the second Pod, and the local second Pod API object comprises the annotation of the second Pod; and
- the annotation of the second Pod comprises a mapping between the internal network description for the second Pod in the second lower Kubernetes cluster and the external network description for the second Pod.

3. The computer-implemented method of claim 1, wherein in the local endpoint API object, an endpoint of a third Pod in the first lower Kubernetes cluster is described as an internal network description for the third Pod in the first lower Kubernetes cluster, further comprising:
- in response to a second request being from the first Pod for accessing a service serving by the third Pod, redirecting, by the first lower Kubernetes cluster, the second request to the endpoint of the third Pod.

4. The computer-implemented method of claim 1, wherein:
- the internal network description for each Pod is a three-tuple for each Pod comprising protocol of network, Pod Internet Protocol (IP), and internal container port; and
- the external network description for each Pod is a different three-tuple for each Pod comprising protocol of network, node IP, external container port.

5. The computer-implemented method of claim 4, further comprising:
- in response to no presence of a corresponding external container port for each internal container port described in the local first Pod API object, selecting, by the first lower Kubernetes cluster, an unused external container port from a configured external container port range for each internal container port as the corresponding external container port for each internal container port.

6. The computer-implemented method of claim 4, wherein creating the local endpoint API object in the first lower Kubernetes cluster based on the endpoint API object in the upper Kubernetes cluster and annotations of the Pods in the upper Kubernetes cluster comprises:
- creating, by the first lower Kubernetes cluster, a first three-tuple for each Pod described in the endpoint API object, the first three-tuple comprising protocol of network, Pod name, and internal container port;
- determining, by the first lower Kubernetes cluster, a second three-tuple for each Pod based on the first three-tuple for each Pod and annotations for the Pods in the upper Kubernetes cluster, the second three-tuple comprising protocol of network, IP, and container port; and
- creating, by the first lower Kubernetes cluster, the local endpoint API object in the first lower Kubernetes cluster based on the second three-tuple.

7. The computer-implemented method of claim 6, wherein determining the second three-tuple for each Pod based on the first three-tuple for each Pod and annotations for the Pods in the upper Kubernetes cluster comprises:
- in response to a determination that a Pod is within the first lower Kubernetes cluster, determining, by the first lower Kubernetes cluster, the second three-tuple for the Pod to be the three-tuple for the Pod; and
- in response to a determination that a different Pod is outside the first lower Kubernetes cluster, determining, by the first lower Kubernetes cluster, the second three-tuple for the Pod to be the three-tuple for the Pod based on the annotations for the Pods in the upper Kubernetes cluster.

8. The computer-implemented method of claim 7, wherein in response to the determination that the Pod is outside the first lower Kubernetes cluster, determining, by the first lower Kubernetes cluster, the second three-tuple for the Pod to be the three-tuple for the Pod based on the annotations for the Pods in the upper Kubernetes cluster comprises:
- in response a determination that the Pod is outside the first lower Kubernetes cluster:
  - converting, by the first lower Kubernetes cluster, the first three-tuple for the Pod to the three-tuple for the Pod;
  - retrieving, by the first lower Kubernetes cluster, the annotation of the Pod using the three-tuple as a keyword from the upper Kubernetes cluster; and
  - obtaining, by the first lower Kubernetes cluster, the three-tuple for the Pod based on retrieved annotation of the Pod.

9. The computer-implemented method of claim 2, wherein the second lower Kubernetes cluster redirects the first request based on Destination Network Address Translation (DNAT) rules generated on the second lower Kubernetes cluster.

10. A computer program product comprising one or more computer readable storage media, wherein the one or more computer readable storage media are not transitory signals per se, and program instructions collectively stored on the one or more computer readable storage media, the program instructions comprising:
- program instructions to create a local first Pod application program interface (API) object in a first lower Kubernetes cluster based on a first Pod API object in an upper Kubernetes cluster, wherein:
  - the local first Pod API object comprises an internal network description and an external network description for a Pod described in the local first Pod API object; and
  - the upper Kubernetes cluster manages the first lower Kubernetes cluster and a second lower Kubernetes cluster;
- program instructions to add an annotation for the Pod to both the local first Pod API object and the first Pod API object, the annotation including a mapping between the internal network description and the external network description for the Pod;
- program instructions to create a local endpoint API object in the first lower Kubernetes cluster based on an endpoint API object in the upper Kubernetes cluster and annotations of Pods in the upper Kubernetes cluster, wherein in the local endpoint API object an endpoint of a second Pod in the second lower Kubernetes cluster is described as an external network description for the second Pod; and
- program instructions to, in response to a first request being from a first Pod within the first lower Kubernetes cluster for accessing a service serving by the second Pod, redirect the first request to the endpoint of the second Pod described in the local endpoint API object.

11. The computer program product of claim 10, wherein:
- the first request is redirected to an internal network description for the second Pod described in a local second Pod API object in the second lower Kubernetes cluster based on an annotation of the second Pod, and the local second Pod API object comprises the annotation of the second Pod; and the annotation of the second Pod comprises a mapping between the internal network description for the second Pod in the second lower Kubernetes cluster and the external network description for the second Pod.

12. The computer program product of claim 10, wherein in the local endpoint API object, an endpoint of a third Pod in the first lower Kubernetes cluster is described as an internal network description for the third Pod in the first lower Kubernetes cluster, further comprising:

program instructions, collectively stored on the one or more computer readable storage media, to, in response to a second request being from the first Pod for accessing a service serving by the third Pod, redirect, by the first lower Kubernetes cluster, the second request to the endpoint of the third Pod.

13. The computer program product of claim 10, wherein:

the internal network description for each Pod is a three-tuple for each Pod comprising protocol of network, Pod Internet Protocol (IP), and internal container port; and the external network description for each Pod is a different three-tuple for each Pod comprising protocol of network, node IP, external container port.

14. The computer program product of claim 13, further comprising:

program instructions, collectively stored on the one or more computer readable storage media, to in response to no presence of a corresponding external container port for each internal container port described in the local first Pod API object, select, by the first lower Kubernetes cluster, an unused external container port from a configured external container port range for each internal container port as the corresponding external container port for each internal container port.

15. The computer program product of claim 13, wherein program instructions to create the local endpoint API object in the first lower Kubernetes cluster based on the endpoint API object in the upper Kubernetes cluster and annotations of the Pods in the upper Kubernetes cluster comprise:

program instructions to create, by the first lower Kubernetes cluster, a first three-tuple for each Pod described in the endpoint API object, the first three-tuple comprising protocol of network, Pod name, and internal container port;

program instructions to determine, by the first lower Kubernetes cluster, a second three-tuple for each Pod based on the first three-tuple for each Pod and annotations for the Pods in the upper Kubernetes cluster, the second three-tuple comprising protocol of network, IP, and container port; and program instructions to create, by the first lower Kubernetes cluster, the local endpoint API object in the first lower Kubernetes cluster based on the second three-tuple.

16. The computer program product of claim 15, wherein program instructions to determine the second three-tuple for each Pod based on the first three-tuple for each Pod and annotations for the Pods in the upper Kubernetes cluster comprise:

program instructions to, in response to a determination that a Pod is within the first lower Kubernetes cluster, determine, by the first lower Kubernetes cluster, the second three-tuple for the Pod to be the three-tuple for the Pod; and program instructions to, in response to a determination that a different Pod is outside the first lower Kubernetes cluster, determine, by the first lower Kubernetes cluster, the second three-tuple for the Pod to be the three-tuple for the Pod based on the annotations for the Pods in the upper Kubernetes cluster.

17. The computer program product of claim 16, wherein program instructions to, in response to the determination that the Pod is outside the first lower Kubernetes cluster, determine, by the first lower Kubernetes cluster, the second three-tuple for the Pod to be the three-tuple for the Pod based on the annotations for the Pods in the upper Kubernetes cluster comprise:

program instructions to, in response a determination that the Pod is outside the first lower Kubernetes cluster:
convert, by the first lower Kubernetes cluster, the first three-tuple for the Pod to the three-tuple for the Pod;
retrieve, by the first lower Kubernetes cluster, the annotation of the Pod using the three-tuple as a keyword from the upper Kubernetes cluster; and
obtain, by the first lower Kubernetes cluster, the three-tuple for the Pod based on retrieved annotation of the Pod.

18. The computer program product of claim 11, wherein the second lower Kubernetes cluster redirects the first request based on Destination Network Address Translation (DNAT) rules generated on the second lower Kubernetes cluster.

19. A computer system comprising:

one or more computer processors, one or more computer readable storage media, and program instructions collectively stored on the one or more computer readable storage media for execution by at least one of the one or more computer processors, the program instructions comprising:

program instructions to create a local first Pod application program interface (API) object in a first lower Kubernetes cluster based on a first Pod API object in an upper Kubernetes cluster, wherein:
the local first Pod API object comprises an internal network description and an external network description for a Pod described in the local first Pod API object; and
the upper Kubernetes cluster manages the first lower Kubernetes cluster and a second lower Kubernetes cluster;

program instructions to add an annotation for the Pod to both the local first Pod API object and the first Pod API object, the annotation including a mapping between the internal network description and the external network description for the Pod;

program instructions to create a local endpoint API object in the first lower Kubernetes cluster based on an endpoint API object in the upper Kubernetes cluster and annotations of the Pods in the upper Kubernetes cluster, wherein in the local endpoint API object an endpoint of a second Pod in the second lower Kubernetes cluster is described as an external network description for the second Pod; and program instructions to, in response to a first request being from a first Pod within the first lower Kubernetes cluster for accessing a service serving by the second Pod, redirect the first request to the endpoint of the second Pod described in the local endpoint API object.

20. The computer system of claim 19, wherein:

the first request is redirected to an internal network description for the second Pod described in a local second Pod API object in the second lower Kubernetes cluster based on an annotation of the second Pod, and the local second Pod API object comprises the annotation of the second Pod; and the annotation of the second Pod comprises a mapping between the internal network description for the second Pod in the second lower Kubernetes cluster and the external network description for the second Pod.

* * * * *